(12) United States Patent
Goto et al.

(10) Patent No.: US 10,540,894 B2
(45) Date of Patent: Jan. 21, 2020

(54) WIRELESS COMMUNICATION DEVICE

(71) Applicant: Panasonic Intellectual Property Management Co., Ltd., Osaka (JP)

(72) Inventors: Shoji Goto, Gifu (JP); Teppei Shibata, Gifu (JP); Hiroyuki Watanabe, Kanagawa (JP); Ken Nakaoka, Aichi (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 14/940,876

(22) Filed: Nov. 13, 2015

(65) Prior Publication Data
US 2016/0155329 A1    Jun. 2, 2016

(30) Foreign Application Priority Data
Dec. 2, 2014    (JP) ................. 2014-244356

(51) Int. Cl.
*G08G 1/0967* (2006.01)
*G08G 1/16* (2006.01)
(Continued)

(52) U.S. Cl.
CPC ....... *G08G 1/096791* (2013.01); *G08G 1/166* (2013.01); *H04W 4/029* (2018.02); *H04W 4/40* (2018.02)

(58) Field of Classification Search
CPC ...... G08G 1/164; G08G 1/0965; G08G 1/005; G08G 1/096716; G01C 21/32;
(Continued)

(56) References Cited

U.S. PATENT DOCUMENTS

| 6,351,698 B1* | 2/2002 | Kubota | ............... B60R 16/0231 340/988 |
| 2005/0156777 A1* | 7/2005 | King | ...................... G01S 3/023 342/29 |

(Continued)

FOREIGN PATENT DOCUMENTS

| JP | 2000-348299 | 12/2000 |
| JP | 2005-010938 A | 1/2005 |

(Continued)

*Primary Examiner* — Nabil H Syed
*Assistant Examiner* — Cal J Eustaquio
(74) *Attorney, Agent, or Firm* — McDermott Will & Emery LLP

(57) ABSTRACT

A wireless communication device mountable in a vehicle acquires first position information on the vehicle and receives a packet signal from another wireless communication device, the packet signal including second position information on another vehicle in which the other wireless communication device is mounted. The wireless communication device has a storage that stores log information and a controller. The controller predicts whether the vehicle crosses the other vehicle at a point of crossing based on the first position information and the second position information, estimates a structure of crossing corresponding to the point of crossing based on the history information, and determines, when it is predicted that the vehicle crosses the other vehicle at the point of crossing, whether or not to notify a presence of the other vehicle to a driver of the vehicle, in accordance with the structure of crossing corresponding to the point of crossing.

12 Claims, 11 Drawing Sheets

(51) Int. Cl.
*H04W 4/40* (2018.01)
*H04W 4/029* (2018.01)

(58) Field of Classification Search
CPC ..... B60W 21/32; H04W 4/023; H04W 4/028; H04W 4/046
See application file for complete search history.

(56) References Cited

U.S. PATENT DOCUMENTS

| | | |
|---|---|---|
| 2006/0217879 A1 | 9/2006 | Ikeuchi et al. |
| 2007/0129892 A1* | 6/2007 | Smartt .................. G01C 21/32 702/5 |
| 2007/0159354 A1* | 7/2007 | Rosenberg ........... G08G 1/0965 340/902 |
| 2010/0057336 A1* | 3/2010 | Levine .................. G01C 21/32 701/532 |
| 2010/0082252 A1 | 4/2010 | Asanuma |
| 2011/0106444 A1* | 5/2011 | Adachi ............ G08G 1/096716 701/532 |
| 2012/0016581 A1* | 1/2012 | Mochizuki ............. G08G 1/161 701/301 |

FOREIGN PATENT DOCUMENTS

| | | |
|---|---|---|
| JP | 2006-053123 A | 2/2006 |
| JP | 2010-127742 A | 6/2010 |
| WO | 2008/146507 A1 | 12/2008 |

* cited by examiner

| VEHICLE | TIME | POSITION | SPEED | AZIMUTH |
|---------|------|----------|-------|---------|
| A1 | B1 | C1 | D1 | E1 |
| A1 | B2 | C2 | D2 | E2 |
| A1 | B3 | C3 | D3 | E3 |
| A2 | B4 | C4 | D4 | E4 |
| A2 | B5 | C5 | D5 | E5 |
| A2 | B6 | C6 | D6 | E6 |
| ⋮ | ⋮ | ⋮ | ⋮ | ⋮ |

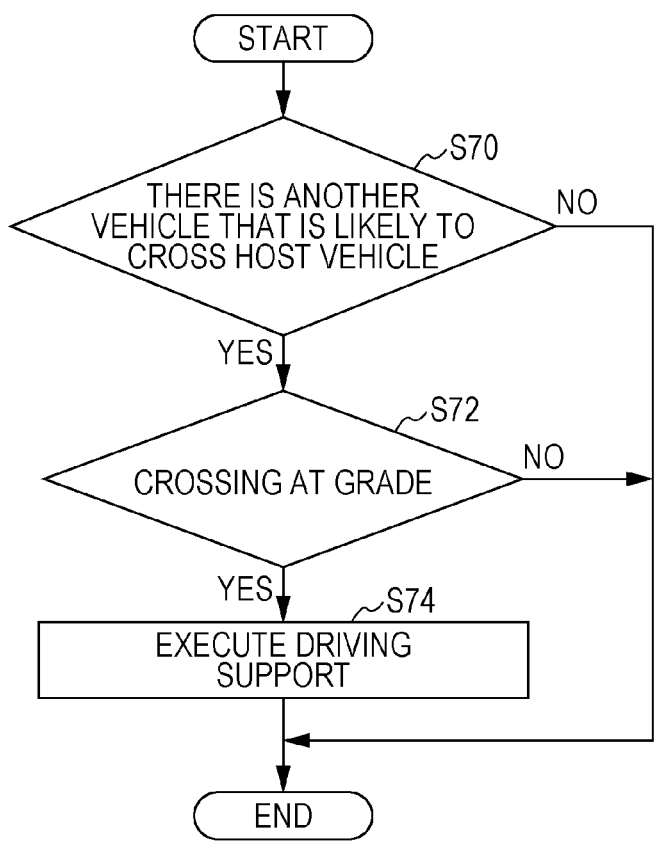

WIRELESS COMMUNICATION DEVICE

BACKGROUND

1. Technical Field

The present disclosure relates to a communication technique. More specifically, the present disclosure relates to a terminal device that receives a signal including predetermined information.

2. Description of the Related Art

A wireless communication device (terminal device) receives information transmitted from another vehicle that is traveling. The wireless communication device determines the necessity of a driving support on the basis of the received information and provides a driver with the driving support (see, for example, Japanese Unexamined Patent Application Publication No. 2000-348299).

In a case where two vehicles traveling on two respective roads that cross each other enter an intersection at timings that are close to each other, there is a risk of collision of these two vehicles. Therefore, a driver should be notified of the risk of collision with the other vehicle as a driving support. However, in a case where crossing of the two roads at a point of crossing is not crossing at grade but crossing with an overpass, there is no risk of collision. Therefore, the driver should not be notified of the risk. In a case where a wireless communication device has a map, whether crossing at a point of crossing is crossing with an overpass or crossing at grade can be determined by checking the map. However, in a case where a wireless communication device does not have a map, it is difficult to determine whether crossing at a point of crossing is crossing with an overpass or crossing at grade.

SUMMARY

One non-limiting and exemplary embodiment provides a technique for suppressing erroneous collision determination at a point of crossing without using a map.

In one general aspect, the techniques disclosed here feature a wireless communication device that is mountable in a vehicle, including: an acquirer that acquires first position information on the vehicle in which the wireless communication device is mounted; a receiver that receives a packet signal from another wireless communication device, the packet signal including second position information on another vehicle in which the other wireless communication device is mounted; a storage that stores log information, the log information including at least one of the previously acquired first position information and the second position information included in the previously received packet signal; and a controller operative to: predict whether the vehicle and the other vehicle cross each other at a point of crossing at which at least two roads cross each other, on the basis of the currently acquired first position information and the second position information included in the currently received packet signal; estimate a structure of crossing corresponding to the point of crossing, on the basis of the stored history information; and determine, in a case where it is predicted that the vehicle and the other vehicle cross each other at the point of crossing, whether or not to notify a presence of the other vehicle to a driver of the vehicle, in accordance with the structure of crossing corresponding to the point of crossing.

According to the present disclosure, it is possible to suppress erroneous collision determination at a point of crossing without using a map.

These general and specific aspects may be implemented using a system, a method, and a computer program, and any combination of systems, methods, and computer programs.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 5 is a diagram illustrating a configuration of data stored in a storage unit in FIG. 4;

FIG. 11 is a flow chart illustrating a support determination procedure of a terminal device in FIG. 4.

DETAILED DESCRIPTION

Figure 1:
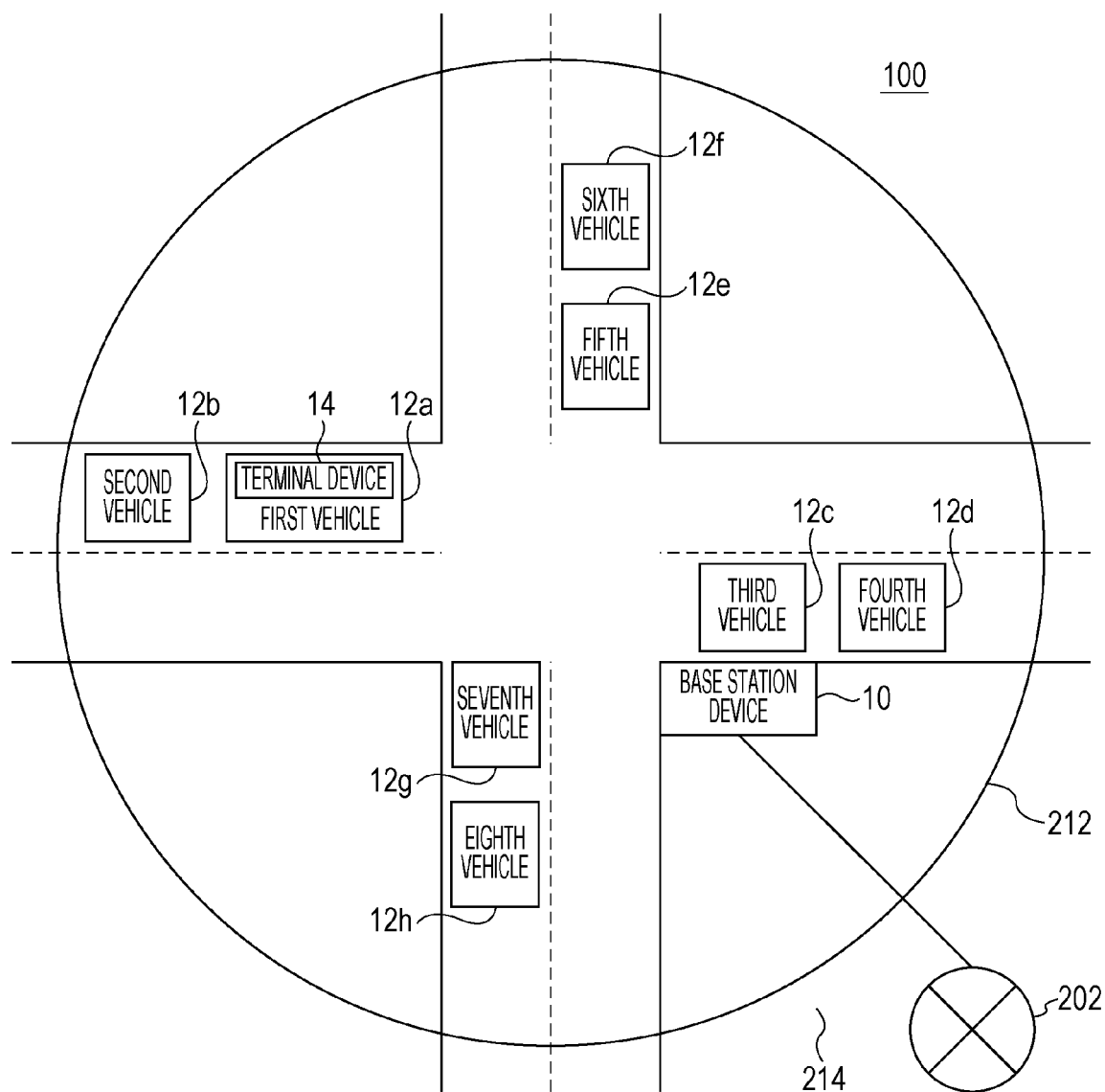
FIG. 1 is a diagram illustrating a configuration of a communication system according to an embodiment of the present disclosure.

Underlying knowledge forming the basis of the present disclosure is described below before a specific embodiment of the present disclosure is described. The embodiment of the present disclosure relates to a communication system in which inter-vehicle communication between terminal devices mounted in vehicles is performed and in which roadside-to-vehicle communication from a base station device provided at an intersection or the like to a terminal device is also performed. Such a communication system is also called ITS (Intelligent Transport Systems). The communication system uses an access control function called CSMA/CA (Carrier Sense Multiple Access with Collision Avoidance) in a similar manner to wireless LAN (Local Area Network) that is compliant with a standard such as IEEE802.11. Therefore, an identical wireless channel is shared by a plurality of terminal devices. Meanwhile, in ITS, it is necessary to transmit information to an indefinitely large number of terminal devices. In order to efficiently perform such transmission, the present communication system broadcasts a packet signal.

That is, a terminal device broadcasts, as inter-vehicle communication, a packet signal in which information such as the position, speed, or traveling direction of a vehicle is stored. Another terminal device receives the packet signal and recognizes the approach or the like of the vehicle on the basis of the information. In order to reduce interference between roadside-to-vehicle communication and inter-vehicle communication, a base station device repeatedly defines a frame including a plurality of sub-frames. The base station device selects, for roadside-to-vehicle communication, any of the plurality of sub-frames, and broadcasts a packet signal in which control information and the like are stored during a period corresponding to the start portion of the selected sub-frame.

The control information includes information concerning a period (hereinafter referred to as a "roadside-to-vehicle communication period") for broadcast transmission of the packet signal by the base station device. A terminal device specifies a roadside-to-vehicle communication period on the basis of the control information and then broadcasts a packet signal by the CSMA method during a period (hereinafter referred to as an "inter-vehicle communication period") other than the roadside-to-vehicle communication period. As a result, the roadside-to-vehicle communication and the inter-vehicle communication are time-division multiplexed. Note that a terminal device that cannot receive the control information from the base station device, i.e., a terminal device that is out of an area formed by the base station device transmits a packet signal by the CSMA method irrespective of the configuration of the frame.

Under such a situation, a terminal device according to the present embodiment derives a support that meets a support occurrence condition on the basis of information included in a packet signal received from another terminal device or a base station device. The present terminal device and a vehicle in which the present terminal device is mounted are collectively referred to as a "host vehicle", and other terminal devices and vehicles in which other terminal devices are mounted are collectively referred to as "other vehicles". The information included in the packet signal is, for example, information on the state of the vehicle transmitted from the other terminal device, information on the state of the vehicle, information on a road shape, or signal information transmitted from the base station device. The "support" refers to a support of driver's driving and is, for example, notification of the presence of another vehicle coming from the opposite direction at a right turn of a host vehicle.

Plural kinds of supports are defined, and a support occurrence condition is defined for each of the supports. An example of the plural kinds of supports is a crossing collision prevention support using inter-vehicle communication. The crossing collision prevention support is executed in a case where a road on which a vehicle is traveling crosses, at a point of crossing, a road on which another vehicle is traveling and where the vehicle and the other vehicle are in a crossing positional relationship. For example, a situation in which the other vehicle is coming from ahead of the host vehicle or from the side of the host vehicle corresponds to the crossing positional relationship. Therefore, in this situation, the crossing collision prevention support is executed. In this case, a driver is prompted to pay attention to the other vehicle that enters the point of crossing from the other road. However, there are cases where crossing at the point of crossing is not crossing at grade but crossing with an overpass. In a case where crossing at the point of crossing is crossing with an overpass, the host vehicle does not collide with the other vehicle. Therefore, the crossing collision prevention support becomes unnecessary. If the type of crossing is not identified, the crossing collision prevention support is mistakenly executed.

Meanwhile, in a case where the terminal device has a map, it is easy to determine whether crossing at the point of crossing is crossing with an overpass or crossing at grade. However, introduction of a map leads to an increase in cost. For this reason, there are cases where the terminal device does not have a map. Even in such a situation, it is desired that whether crossing at the point of crossing is crossing with an overpass or crossing at grade be determined. In view of this, a terminal device according to the present embodiment analyses traveling information of a vehicle that has passed an intersection and determines that the intersection is crossing with an overpass in a case where a difference between an inflow speed and an outflow speed of a vehicle passing the intersection is smaller than a threshold value and where a difference between an inflow direction and an outflow direction of the vehicle entering the intersection is smaller than a threshold value.

FIG. 1 illustrates a configuration of a communication system 100 according to an embodiment of the present disclosure. FIG. 1 illustrates an intersection viewed from above. The communication system 100 includes a base station device 10; a first vehicle 12a, a second vehicle 12b, a third vehicle 12c, a fourth vehicle 12d, a fifth vehicle 12e, a sixth vehicle 12f, a seventh vehicle 12g, and an eighth vehicle 12h, which are collectively referred to as vehicles 12; and a network 202. In FIG. 1, only a terminal device 14 mounted in the first vehicle 12a is illustrated, but a terminal device 14 is mounted in each of the vehicles 12. Furthermore, an area 212 is formed around the base station device 10, and an outside area 214 is formed outside the area 212.

As illustrated in FIG. 1, a road extending in a horizontal direction, i.e., a left-right direction of FIG. 1 crosses, at a central part, a road extending in a vertical direction, i.e., an top-bottom direction of FIG. 1. In FIG. 1, the top side corresponds to "north", the left side corresponds to "west", the bottom side corresponds to "south", and the right side corresponds to "east". A part at which these two roads cross each other is an "intersection". The first vehicle 12a and the second vehicle 12b are traveling from left to right, and the third vehicle 12c and the fourth vehicle 12d are traveling from right to left. The fifth vehicle 12e and the sixth vehicle 12f are traveling from top to bottom, and the seventh vehicle 12g and the eighth vehicle 12h are traveling from bottom to top.

In the communication system 100, the base station device 10 is fixedly installed at the intersection. The base station device 10 controls communication between the terminal devices. The base station device 10 repeatedly generates a frame including a plurality of sub-frames on the basis of a signal received from a GPS (Global Positioning System) satellite (not illustrated) or a frame formed by another base station device 10 (not illustrated). It is specified that a roadside-to-vehicle communication period can be set at the start of each of the sub-frames.

The base station device 10 selects a sub-frame in which no roadside-to-vehicle communication period is set by another base station device 10 from the plurality of sub-frames included in the frame. The base station device 10 sets a roadside-to-vehicle communication period at the start of the selected sub-frame. The base station device 10 broadcasts a packet signal during the set roadside-to-vehicle communication period. A plurality of packet signals may be broadcast during the roadside-to-vehicle communication period. The packet signal includes, for example, accident information, traffic jam information, and signal information. Note that the packet signal also includes information concerning a timing at which the roadside-to-vehicle communication period is set and control information concerning the frame.

The terminal device 14 is mounted in each of the vehicles 12 as described above and can therefore be transported. Upon receipt of the packet signal from the base station device 10, the terminal device 14 estimates that the terminal device 14 is within the area 212. In a case where the terminal device 14 is within the area 212, the terminal device 14 generates a frame on the basis of control information included in the packet signal, especially information concerning a timing at which the roadside-to-vehicle communication period is set and information concerning the frame. As a result, the frame generated in each of the plurality of terminal devices 14 is in sync with the frame generated in the base station device 10. The terminal device 14 broadcasts a packet signal during an inter-vehicle communication period that is different from the roadside-to-vehicle communication period. During the inter-vehicle communication period, CSMA/CA is performed. Meanwhile, in a case where the terminal device 14 estimates that the terminal device 14 is within the outside area 214, the terminal device 14 broadcasts a packet signal by performing CSMA/CA irrespective of the configuration of the frame. The terminal device 14 recognizes an approach or the like of a vehicle 12 in which another terminal device 14 is mounted on the basis of a packet signal from the other terminal device 14.

Figure 2:
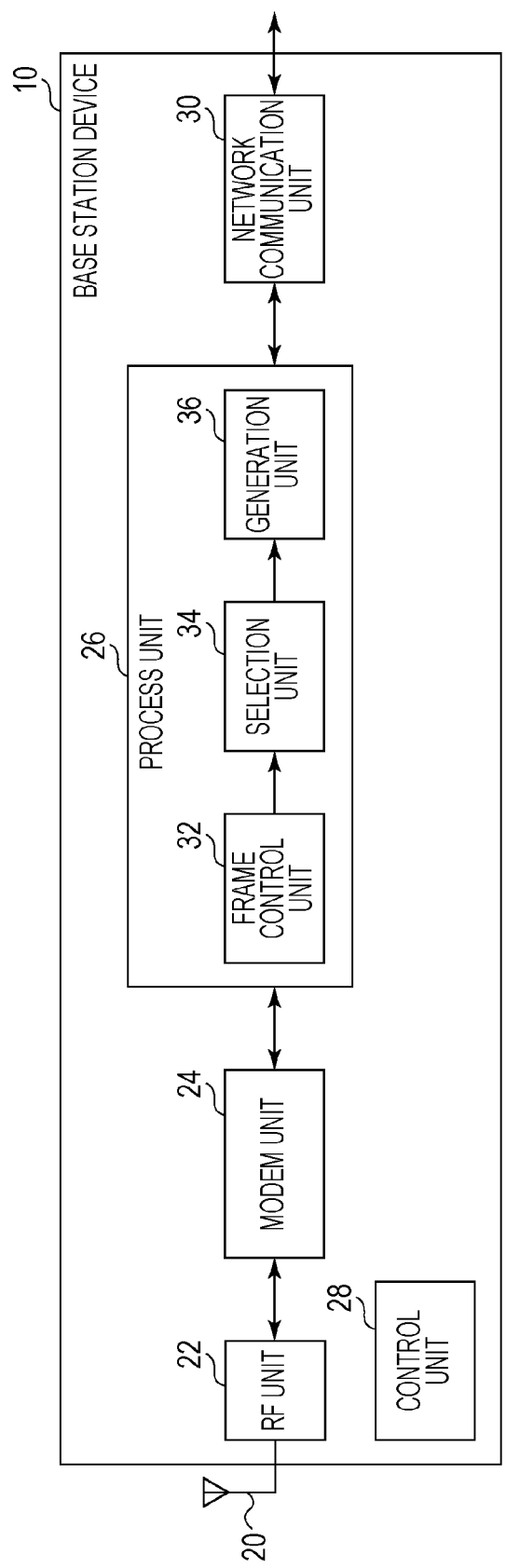
FIG. 2 is a diagram illustrating a configuration of a base station device in FIG. 1.

FIG. 2 illustrates a configuration of the base station device 10. The base station device 10 includes an antenna 20, an RF unit 22, a modem unit 24, a process unit 26, a control unit 28, and a network communication unit 30. The process unit 26 includes a frame control unit 32, a selection unit 34, and a generation unit 36.

The RF unit 22 receives, as a receiving process, a packet signal from a terminal device 14 or another base station device 10 (not illustrated) via the antenna 20. The RF unit 22 converts the frequency of the received wireless frequency packet signal to generate a baseband packet signal. Furthermore, the RF unit 22 supplies the baseband packet signal to the modem unit 24. In general, the baseband packet signal is made up of an in-phase component and an orthogonal component, and therefore two signal lines should be illustrated. However, for clarity in FIG. 2, only one signal line is illustrated. The RF unit 22 includes an LNA (Low Noise Amplifier), a mixer, an AGC, and an A/D converter unit.

The RF unit 22 converts, as a transmitting process, the frequency of the baseband packet signal supplied from the modem unit 24 to generate a wireless frequency packet signal. Furthermore, the RF unit 22 transmits the wireless frequency packet signal via the antenna 20 during the roadside-to-vehicle communication period. The RF unit 22 includes a PA (Power Amplifier), a mixer, and a D/A converter unit.

The modem unit 24 demodulates, as a receiving process, the baseband packet signal from the RF unit 22. Furthermore, the modem unit 24 supplies a demodulation result to the process unit 26. Moreover, the modem unit 24 modulates, as a transmitting process, data from the process unit 26. Furthermore, the modem unit 24 supplies, as a baseband packet signal, a modulation result to the RF unit 22. Since the communication system 100 supports an OFDM (Orthogonal Frequency Division Multiplexing) modulation method, the modem unit 24 also performs, as a receiving process, FFT (Fast Fourier Transform) and performs, as a transmitting process, IFFT (Inverse Fast Fourier Transform).

The frame control unit 32 receives a signal from a GPS satellite (not illustrated) and acquires time information on the basis of the received signal. Note that acquisition of the time information can be performed by using a known art, and description thereof is omitted. The frame control unit 32 generates a plurality of frames on the basis of the time information. For example, the frame control unit 32 generates 10 frames of "100 msec" by dividing a period of "1 sec" into 10 sections on the basis of a timing indicated in the time information. By repeating such a process, a frame is repeatedly defined. Note that the frame control unit 32 may detect control information from the demodulation result and generate a frame on the basis of the detected control information. Such a process corresponds to generating a frame that is in sync with a timing of a frame generated by another base station device 10.

Figure 3:
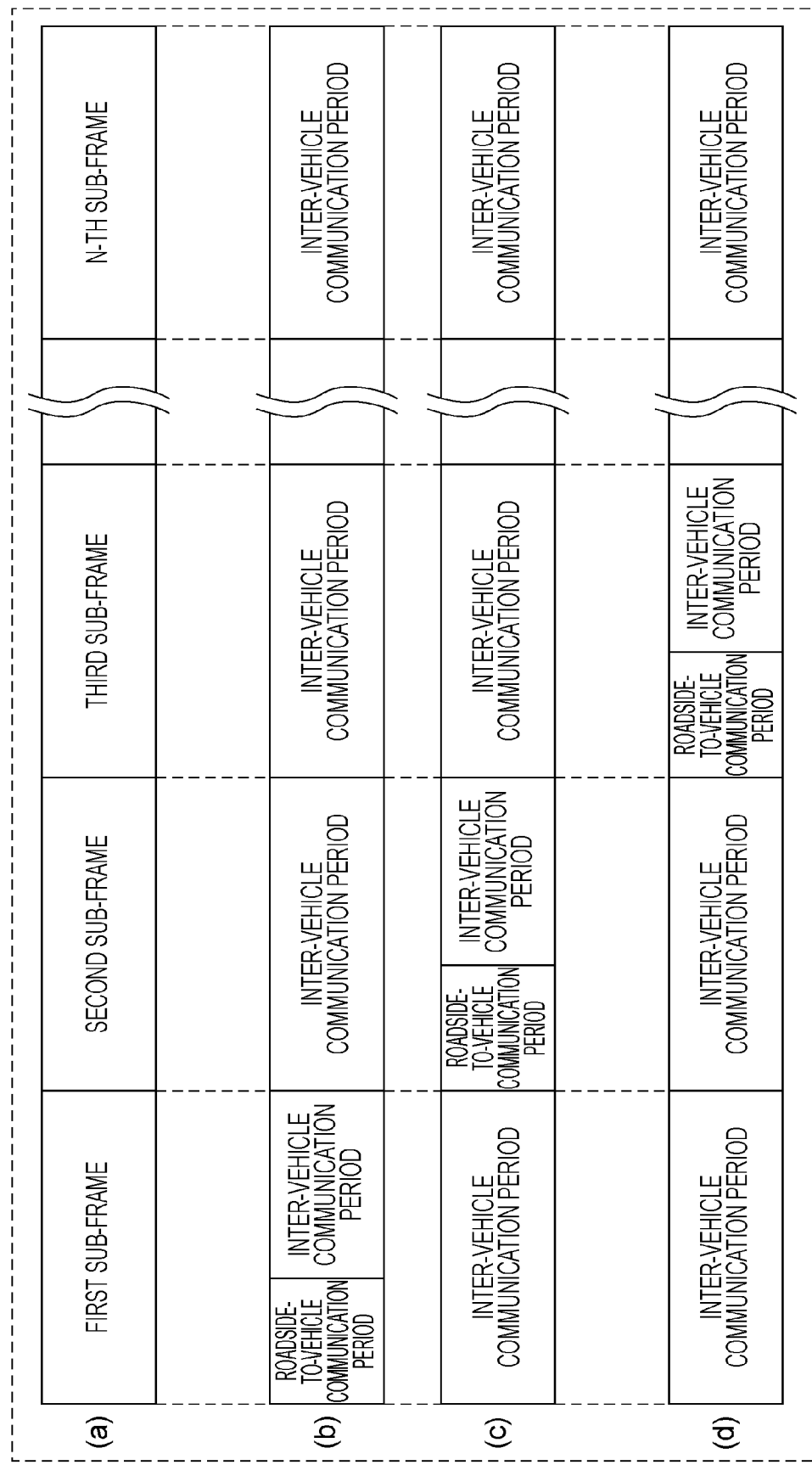
FIG. 3 is a diagram illustrating a format of a frame defined in the communication system in FIG. 1.

FIG. 3 illustrates a format of a frame defined in the communication system 100. FIG. 3(a) illustrates a configuration of the frame. The frame is made up of N sub-frames, i.e., the first sub-frame through the N-th sub-frame. That is, it can be said that the frame is formed by time-multiplexing a plurality of sub-frames that can be used for broadcast of a packet signal by the terminal device 14. For example, in a case where the length of the frame is 100 msec and where N is 8, sub-frames each having a length of 12.5 msec are defined. N may be a number other than 8. FIGS. 3(b) through 3(d) are described later. The following description returns to FIG. 2.

The selection unit 34 selects a sub-frame in which a roadside-to-vehicle communication period should be set from among the plurality of sub-frames included in the frame. Specifically, the selection unit 34 accepts the frame defined by the frame control unit 32. Furthermore, the selection unit 34 accepts an instruction concerning the selected sub-frame via an interface (not illustrated). The selection unit 34 selects a sub-frame corresponding to the instruction. Separately from this, the selection unit 34 may automatically select a sub-frame. In this case, the selection unit 34 receives a demodulation result from another base station device 10 or a terminal device 14 (not illustrated) via the RF unit 22 and the modem unit 24. The selection unit 34 extracts the demodulation result received from another base station device 10. The selection unit 34 specifies a sub-frame for which the demodulation result has not been accepted by specifying a sub-frame for which the demodulation result has been accepted.

This corresponds to specifying a sub-frame in which a roadside-to-vehicle communication period has not been set by another base station device 10, i.e., an unused sub-frame. In a case where there are a plurality of unused sub-frames, the selection unit 34 randomly selects one sub-frame. In a case where there is no unused sub-frame, i.e., in a case where each of the plurality of sub-frames is being used, the selection unit 34 acquires reception electric power corresponding to the demodulation result and preferentially selects a sub-frame of small reception electric power.

FIG. 3(b) illustrates a configuration of a frame generated by a first base station device 10a (not illustrated). The first base station device 10a sets a roadside-to-vehicle communication period at the start of a first sub-frame. Furthermore, the first base station device 10a sets an inter-vehicle communication period in a period of the first sub-frame excluding a roadside-to-vehicle communication period and in the second to N-th sub-frames. The inter-vehicle communication period is a period in which the terminal device 14 can broadcast a packet signal. That is, it is specified that the first base station device 10a can broadcast a packet signal during the roadside-to-vehicle communication period, which is the start of the first sub-frame, and the terminal device 14 can broadcast a packet signal during an inter-vehicle communication period other than the roadside-to-vehicle communication period in the frame.

FIG. 3(c) illustrates a configuration of a frame generated by a second base station device 10b (not illustrated). The second base station device 10b sets a roadside-to-vehicle communication period at the start of a second sub-frame.

Furthermore, the second base station device 10b sets an inter-vehicle communication period in a period of the second sub-frame excluding the roadside-to-vehicle communication period, the first sub-frame, and the third sub-frame through the N-th sub-frame. FIG. 3(d) illustrates a configuration of a frame generated by a third base station device 10c (not illustrated). The third base station device 10c sets a roadside-to-vehicle communication period at the start of the third sub-frame. Furthermore, the third base station device 10c sets an inter-vehicle communication period in a period of the third sub-frame excluding the roadside-to-vehicle communication period, the first sub-frame, the second sub-frame, and the fourth sub-frame through the N-th sub-frame. In this way, the plurality of base station devices 10 select different sub-frames and set a roadside-to-vehicle communication period at the start of the selected sub-frames. The following description returns to FIG. 2. The selection unit 34 supplies a number of the selected sub-frame to the generation unit 36.

The generation unit 36 receives the number of the sub-frame from the selection unit 34. The generation unit 36 sets a roadside-to-vehicle communication period in the sub-frame having the received sub-frame number, and generates a packet signal that should be broadcast in the roadside-to-vehicle communication period. In a case where a plurality of packet signals are transmitted during one roadside-to-vehicle communication period, the generation unit 36 generates these packet signals. A packet signal is made up of control information and a payload. The control information includes, for example, a number of a sub-frame in which a roadside-to-vehicle communication period has been set. The payload includes, for example, accident information, traffic jam information, and signal information. These data are acquired from the network 202 (not illustrated) by the network communication unit 30. The process unit 26 causes the modem unit 24 and the RF unit 22 to broadcast a packet signal during the roadside-to-vehicle communication period. The control unit 28 controls the process of the whole base station device 10.

This configuration is realized by a CPU, memory, and other LSI of any computer in the case of hardware and is realized by a program loaded to memory in the case of software. In FIG. 2, functional blocks realized by cooperation of these are illustrated. Therefore, it is understood by a person skilled in the art that these functional blocks are realized in various forms by hardware only or by a combination of hardware and software.

Figure 4:
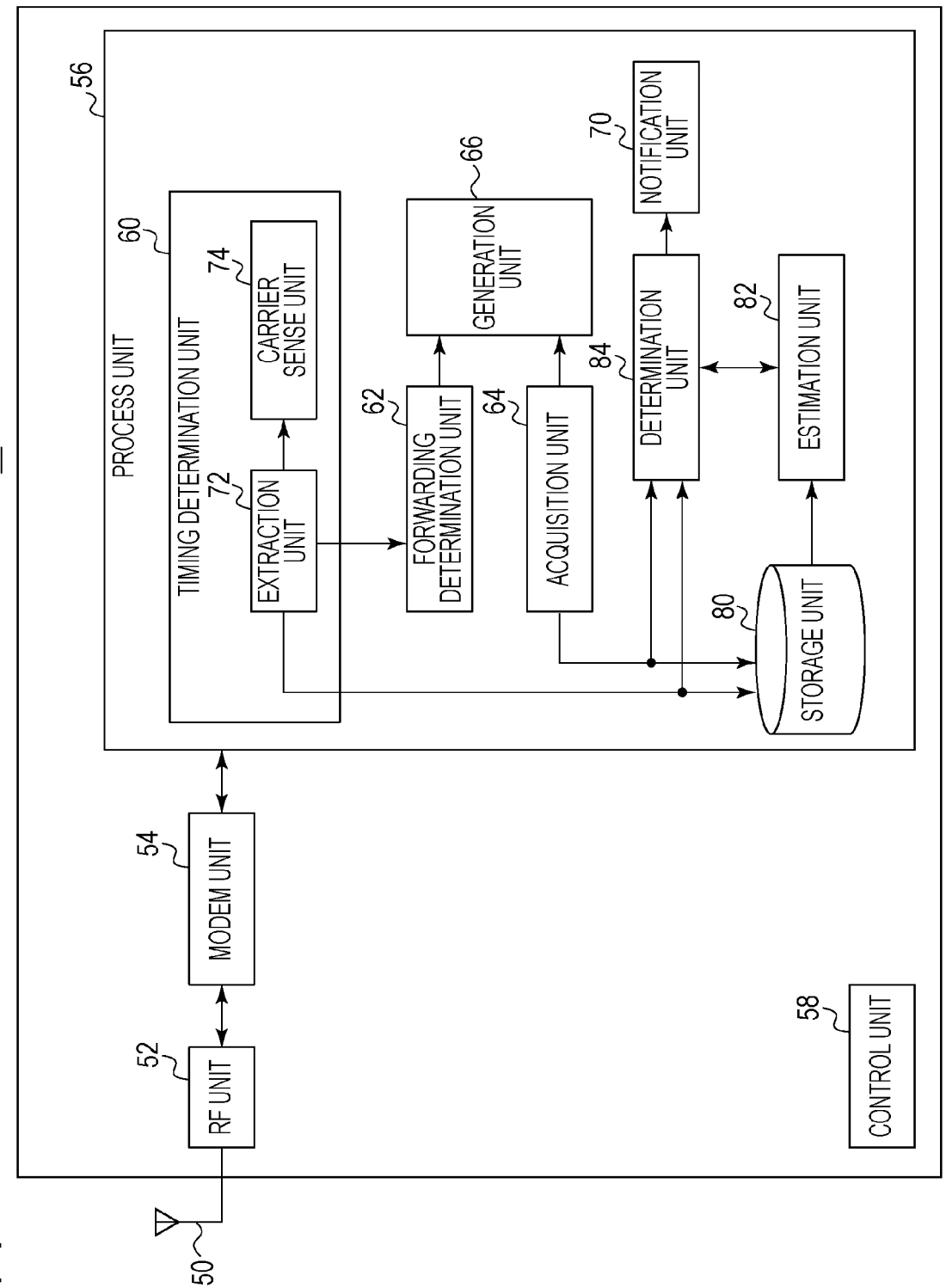
FIG. 4 is a diagram illustrating a configuration of a terminal device in FIG. 1.

FIG. 4 illustrates a configuration of the terminal device 14. The terminal device 14 includes an antenna 50, an RF unit 52, a modem unit 54, a process unit 56, and a control unit 58. The process unit 56 includes a timing determination unit 60, a forwarding determination unit 62, an acquisition unit 64, a generation unit 66, a notification unit 70, a storage unit 80, an estimation unit 82, and a determination unit 84. The timing determination unit 60 includes an extraction unit 72 and a carrier sense unit 74. The terminal device 14 can be mounted in each of the vehicles 12 as described above. The antenna 50, the RF unit 52, and the modem unit 54 perform similar processes to the antenna 20, the RF unit 22, and the modem unit 24 of FIG. 2. The following discusses mainly differences.

The modem unit 54 and the process unit 56 receive, in a receiving process, a packet signal from another terminal device 14 or the base station device 10 (not illustrated). As described above, the modem unit 54 and the process unit 56 receive a packet signal from the base station device 10 during a roadside-to-vehicle communication period, and receive a packet signal from another terminal device 14 during an inter-vehicle communication period. The packet signal from another terminal device 14 includes at least the current position, traveling direction, traveling speed, and the like (hereinafter referred to as "position information") of another vehicle 12 in which this terminal device 14 is mounted.

In a case where a demodulation result supplied from the modem unit 54 is a packet signal from the base station device 10 (not illustrated), the extraction unit 72 specifies a timing of a sub-frame in which a roadside-to-vehicle communication period is set. In this case, the extraction unit 72 estimates that the terminal device 14 is within the area 212 of FIG. 1. The extraction unit 72 generates a frame on the basis of the timing of the sub-frame and the contents of a message header of the packet signal, specifically, the contents in the roadside-to-vehicle communication period. Note that generation of the frame is performed in the same manner as the frame control unit 32, and description thereof is omitted. As a result, the extraction unit 72 generates a frame that is in sync with the frame generated in the base station device 10. In a case where a source of broadcast of the packet signal is another terminal device 14, the extraction unit 72 omits a process of generating a synchronized frame, but extracts position information included in the packet signal and supplies the extracted position information to the storage unit 80 and the determination unit 84.

Meanwhile, in a case where the packet signal from the base station device 10 is not received, the extraction unit 72 estimates that the terminal device 14 is within the outside area 214 of FIG. 1. In a case where the extraction unit 72 estimates that the terminal device 14 is within the area 212, the extraction unit 72 selects an inter-vehicle communication period. In a case where the extraction unit 72 estimates that the terminal device 14 is within the outside area 214, the extraction unit 72 selects a timing that is not related to the configuration of the frame. In a case where the extraction unit 72 selects the inter-vehicle communication period, the extraction unit 72 supplies information concerning timings of the frame and the sub-frame and the inter-vehicle communication period to the carrier sense unit 74. In a case where the extraction unit 72 selects a timing that is not related to the configuration of the frame, the extraction unit 72 instructs the carrier sense unit 74 to perform carrier sense.

The carrier sense unit 74 accepts the information concerning timings of the frame and the sub-frame and the inter-vehicle communication period from the extraction unit 72. The carrier sense unit 74 determines a transmission timing by starting CSMA/CA during the inter-vehicle communication period. Meanwhile, in a case where the carrier sense unit 74 is instructed by the extraction unit 72 to perform carrier sense that is not related to the configuration of the frame, the carrier sense unit 74 determines a transmission timing by performing CSMA/CA without considering the configuration of the frame. The carrier sense unit 74 notifies the modem unit 54 and the RF unit 52 of the determined transmission timing and causes the modem unit 54 and the RF unit 52 to broadcast a packet.

The forwarding determination unit 62 controls transfer of the control information. The forwarding determination unit 62 extracts information to be transferred from the control information. The forwarding determination unit 62 generates information that should be transferred on the basis of the extracted information. Description of this process is omitted. The forwarding determination unit 62 supplies the information that should be transferred, i.e., part of the control information to the generation unit 66.

The acquisition unit 64 includes a GPS receiver, a gyroscope, a vehicle speed sensor, and the like (not illustrated), and acquires the current position, travelling direction, traveling speed, and the like (collectively referred to as "position information" as described above) of the vehicle 12 (not illustrated), i.e., the vehicle 12 in which the terminal device 14 is mounted on the basis of data supplied from the GPS receiver, the gyroscope, the vehicle speed sensor, and the like. The current position is indicated by latitude and longitude. The traveling direction is indicated by an azimuth assuming that a clockwise direction from north which is a reference of traveling direction (0 degree) is a positive angle. The acquisition of the current position, travelling direction, traveling speed, and the like can be performed by using a known art, and description thereof is omitted. The traveling direction is also called an azimuth. The acquisition unit 64 supplies these pieces of information to the generation unit 66, the storage unit 80, and the determination unit 84.

The generation unit 66 accepts the information from the acquisition unit 64 and accepts part of the control information from the forwarding determination unit 62. The generation unit 66 generates a packet signal including these pieces of information and broadcasts the generated packet signal via the modem unit 54, the RF unit 52, and the antenna 50 at the transmission timing determined by the carrier sense unit 74. This corresponds to inter-vehicle communication.

The storage unit 80 accepts the position information and the like from the extraction unit 72 and the position information and the like from the acquisition unit 64. The storage unit 80 stores therein, as path history information, at least one of these pieces of position information and the like that are previously accepted. FIG. 5 illustrates a configuration of data stored in the storage unit 80. For example, the path history information includes identification information of a vehicle, information on the time of acquisition of information, position information, speed information, and an azimuth. In this way, a history of position information, speed information, and azimuth of a single vehicle 12 is stored with a change of time. Such a history is stored in a plurality of vehicles 12. The following description returns to FIG. 4.

The estimation unit 82 estimates whether a structure of crossing at a point of crossing at which at least two roads cross each other, for example, crossing at the point of crossing is crossing at grade or crossing with an overpass on the basis of the path history information stored in the storage unit 80. Note that information concerning the structure of crossing at the point of crossing and a map are not stored in the present terminal device 14.

The estimation unit 82 first specifies the point of crossing to be estimated in a process of estimating a structure of crossing. The estimation unit 82 extracts a plurality of points of crossing at which two roads cross each other on the basis of the position information and the like of the vehicle 12 included in the path history information. The points of crossing are set on the basis of information on an intersection point at which traveling trajectories of two vehicles 12 traveling in directions that cross each other cross each other. Furthermore, the estimation unit 82 acquires information concerning a prediction point of crossing and the like from the determination unit 84 that will be described later in a case where it is determined that the host vehicle and the other vehicle encounter within a predetermined period of time in a collision prevention support. The prediction point of crossing is a point at which it is determined that the host vehicle and the other vehicle encounter within a predetermined period of time among the points of crossing and the intersection point. Furthermore, the estimation unit 82 specifies a point of crossing corresponding to the prediction point of crossing among the extracted plurality of points of crossing. Subsequently, the estimation unit 82 estimates the type of crossing at the specified point of crossing (the prediction point of crossing). This process is described in more detail below.

Figure 6:
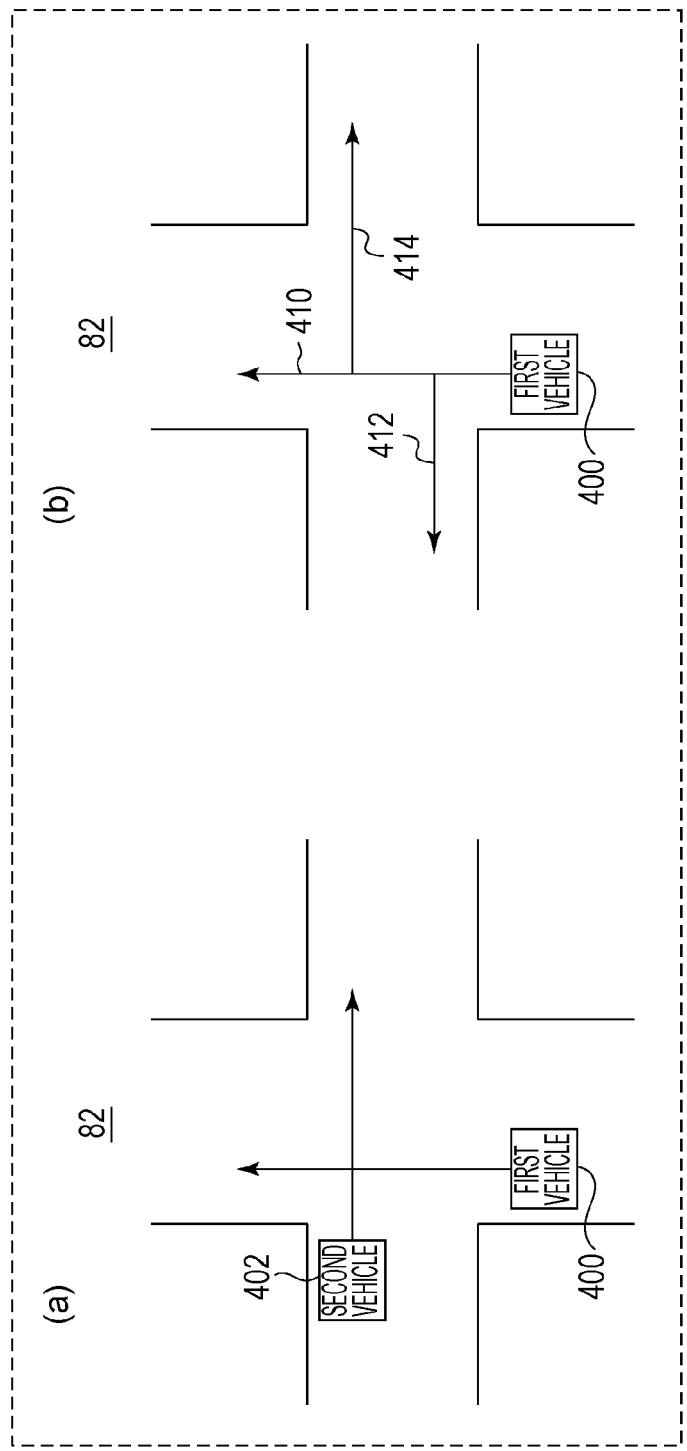
FIG. 6 is a diagram illustrating an outline of a process in an estimation unit in FIG. 4.

The estimation unit 82 extracts information on a vehicle 12 passing the specified point of crossing from the path history information stored in the storage unit 80. In general, the estimation unit 82 extracts information on a plurality of vehicles 12. More preferably, the estimation unit 82 extracts information on a vehicle 12 that has passed the intersection from the same direction as the host vehicle and information on a vehicle 12 passing the intersection from the same direction as the other vehicle that is determined to encounter the host vehicle by the determination unit 84 that will be described later. Processing performed on vehicles 12 passing the point of crossing is described below with reference to FIG. 6. FIG. 6 illustrates an outline of processing in the estimation unit 82. In FIG. 6(*a*), a first vehicle 400 travels on one of two roads that cross at a point of crossing, and a second vehicle 402 travels on the other one of the two roads. In a case where crossing at the point of crossing is crossing at grade, one of the first vehicle 400 and the second vehicle 402 stops before entering the point of crossing in accordance with a traffic signal or a priority relationship in the case of an intersection with no traffic signal. Then, the one of the first vehicle 400 and the second vehicle 402 that stopped starts moving. Meanwhile, in a case where crossing at the point of crossing is crossing with an overpass, the first vehicle 400 and the second vehicle 402 pass the point of crossing while keeping a certain speed, for example, unless the first vehicle 400 and the second vehicle 402 are stuck in a traffic jam.

The estimation unit 82 derives a change of the speed of each vehicle 12 passing the point of crossing on the basis of the extracted information. This corresponds, for example, to calculating a difference between a maximum speed and a minimum speed of a vehicle 12 within a certain distance (e.g., 20 m) around the point of crossing. Furthermore, the estimation unit 82 compares a change of the speed with a threshold value. The threshold value is set to a difference between a speed at the start of deceleration and a speed at the time of stoppage or a difference between a speed at the time of stoppage and a speed at the start of acceleration assuming that the vehicle 12 stops just before the point of crossing at grade. The estimation unit 82 detects a vehicle 12 whose change of speed exceeds the threshold value and a vehicle 12 whose change of speed does not exceed the threshold value by performing such processing on the vehicles 12. In a case where the estimation unit 82 detects at least one vehicle 12 whose change of speed exceeds the threshold value, the estimation unit 82 estimates that the point of crossing is crossing at grade. In a case where the estimation unit 82 detects only vehicles 12 whose change of speed does not exceed the threshold value, the estimation unit 82 estimates that the point of crossing is crossing with an overpass. More preferably, the estimation unit 82 derives a change of speed, during traveling at the point of crossing, of a vehicle 12 that has passed the intersection from the same direction as the host vehicle on the basis of information on this vehicle 12, and derives a change of speed, during traveling at the point of crossing, of a vehicle 12 passing the intersection from the same direction as the other vehicle that is determined to encounter the host vehicle on the basis of information on this vehicle 12. In a case where the estimation unit 82 detects at least one vehicle 12 whose change of speed exceeds the threshold value from among the vehicle 12 that has passed the intersection from the same direction as the host vehicle and the vehicle 12 passing the intersection from the same direction as the other vehicle that is determined to encounter the host vehicle, the estimation unit 82 estimates that the point of crossing is crossing at grade. Meanwhile, in a case where both of the vehicle 12 that has passed the intersection from the same direction as the host vehicle and the vehicle 12 passing the intersection from the same direction as the other vehicle that is determined to encounter the host vehicle are vehicles 12 whose change of speed does not exceed the threshold value, the estimation unit 82 estimates that the point of crossing is crossing with an overpass.

In FIG. 6(b), the first vehicle 400 enters the point of crossing. In a case where crossing at the point of crossing is crossing at grade, the first vehicle 400 travels on any one of a straight path 410, a left-turn path 412, and a right-turn path 414. Meanwhile, in a case where crossing at the point of crossing is crossing with an overpass, the first vehicle 400 travels only on the straight path 410. The estimation unit 82 derives a change of traveling direction of each vehicle 12 passing the point of crossing on the basis of the extracted information. This corresponds, for example, to calculating an absolute value of a difference between an azimuth at which a vehicle 12 enters the point of crossing and an azimuth at which the vehicle 12 exits the point of crossing. Furthermore, the estimation unit 82 compares the change of traveling direction with a threshold value.

The threshold value is set to a value by which the straight path 410 can be distinguished from the left-turn path 412 and the right-turn path 414 in FIG. 6(b). The estimation unit 82 derives a vehicle 12 whose change of traveling direction exceeds the threshold value and a vehicle 12 whose change of traveling direction does not exceed the threshold value by performing such processing on the vehicles 12. In a case where the estimation unit 82 detects at least one vehicle 12 whose change of traveling direction exceeds the threshold value, the estimation unit 82 estimates that the point of crossing is crossing at grade. In a case where the estimation unit 82 detects only vehicles 12 whose change of traveling direction does not exceed the threshold value, the estimation unit 82 estimates that the point of crossing is crossing with an overpass. More preferably, the estimation unit 82 derives a change of traveling direction, during traveling at the point of crossing, of a vehicle 12 that has passed the intersection from the same direction as the host vehicle on the basis of information on this vehicle 12, and derives a change of traveling direction, during traveling at the point of crossing, of a vehicle 12 passing intersection from the same direction as the other vehicle that is determined to encounter the host vehicle on the basis of information on this vehicle 12. In a case where the estimation unit 82 detects at least one vehicle 12 whose change of traveling direction exceeds the threshold value from among the vehicle 12 that has passed the intersection from the same direction as the host vehicle and the vehicle 12 passing intersection from the same direction as the other vehicle that is determined to encounter the host vehicle, the estimation unit 82 estimates that the point of crossing is crossing at grade. Meanwhile, in a case where both of the vehicle 12 that has passed the intersection from the same direction as the host vehicle and the vehicle 12 passing intersection from the same direction as the other vehicle that is determined to encounter the host vehicle are vehicles 12 whose change of traveling direction does not exceed the threshold value, the estimation unit 82 estimates that the point of crossing is crossing with an overpass.

Note that the estimation unit 82 may finally estimates that the point of crossing is crossing with an overpass in a case where the estimation unit 82 estimates that the point of crossing is crossing with an overpass on the basis of a change of speed and estimates that the point of crossing is crossing with an overpass on the basis of a change of traveling direction. Meanwhile, the estimation unit 82 may finally estimates that the point of crossing is crossing at grade in a case where these conditions are not met. As described above, at a point of crossing at grade, a change of speed of a vehicle 12 traveling on any one of traffic lanes that cross each other is large due to deceleration or acceleration in accordance with traffic signal control or a change of azimuth of a vehicle 12 traveling on any one of traffic lanes that cross each other is large due to a right turn, a left turn, or a U-turn. Meanwhile, in a case where the intersection is crossing with an overpass, these changes do not occur, and a vehicle 12 passes the intersection while keeping a speed and an azimuth within a certain range.

Furthermore, the estimation unit 82 may use elevation information to estimate whether crossing at a point of crossing is crossing with an overpass or crossing at grade. In this case, elevation information acquired by a GPS is included in the path history information. The estimation unit 82 derives a difference in elevation between vehicles 12 traveling on respective two roads that cross each other at a point of crossing from the path history information stored in the storage unit 80. The estimation unit 82 may derive a single difference in elevation by averaging a plurality of differences in elevation. The estimation unit 82 compares the difference in elevation with a threshold value. The threshold value is set to a value that is equivalent to a vehicle height. In a case where the difference in elevation is smaller than the threshold value, the estimation unit 82 estimates that the point of crossing is crossing at grade. In a case where the difference in elevation is not smaller than the threshold value, the estimation unit 82 estimates that the point of crossing is crossing with an overpass.

Figure 7:
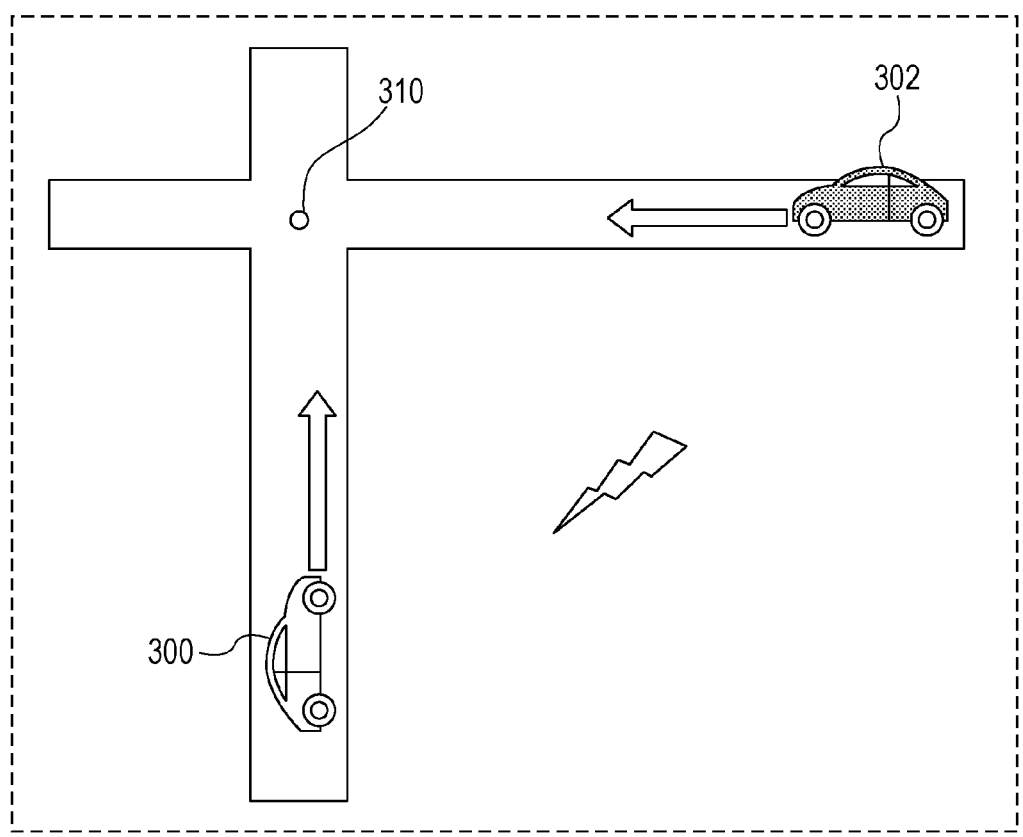
FIG. 7 is a diagram illustrating a crossing collision prevention support in a determination unit in FIG. 4.

The determination unit 84 derives a support that should be provided among plural types of supports on the basis of the information acquired by the acquisition unit 64 and the information supplied from the extraction unit 72. The plural types of supports are, for example, a right-turn collision prevention support, a left-turn collision prevention support, and a crossing collision prevention support. In the following description, the crossing collision prevention support is described. In the crossing collision prevention support (inter-vehicle communication), a driver is notified of the presence of an approaching vehicle in a case where another vehicle is approaching so as to cross a host vehicle traveling straight. FIG. 7 illustrates the crossing collision prevention support in the determination unit 84. A host vehicle 300 is traveling from bottom to top of FIG. 7 as indicated by the arrow, and another vehicle 302 is traveling from right to left of FIG. 7 as indicated by the arrow. A path on which the host vehicle 300 is traveling and a path on which the other vehicle 302 is traveling cross each other at a point of crossing 310. In this situation, the determination unit 84 acquires, as information from the host vehicle 300, the position, speed, acceleration, and azimuth of the host vehicle 300 from a GPS or an on-board network such as a CAN (Controller Area Network).

Furthermore, the determination unit 84 acquires, as information from the other vehicle 302, the position, speed, acceleration, and azimuth of the other vehicle 302. On the basis of these pieces of information, the determination unit 84 determines occurrence of the crossing collision prevention support in a case where (i) the host vehicle 300 and the other vehicle 302 are in a positional relationship such that the host vehicle 300 and the other vehicle 302 cross each other and (ii) the host vehicle 300 and the other vehicle 302 encounter each other within a predetermined period of time. In a case where the determination unit 84 determines occurrence of the crossing collision prevention support, i.e., in a case where it is predicted that the host vehicle 300 (a vehicle 12) and the other vehicle 302 (another vehicle 12) cross each other at the point of crossing, the determination unit 84 determines whether or not to notify a driver of the presence of the other vehicle 302 (the other vehicle 12) in accordance with a structure of crossing corresponding to the point of crossing. In a case where the estimation unit 82 estimates that crossing at the point of crossing is crossing at grade, it is determined that the driver is notified of the presence of the other vehicle 302 (the other vehicle 12). Meanwhile, in a case where the estimation unit 82 estimates that crossing at the point of crossing is crossing with an overpass, it is determined that the driver is not notified of the presence of the other vehicle 302 (the other vehicle 12).

In a case where the determination unit 84 determines that the driver is notified of the presence of the other vehicle 302 (the other vehicle 12), the notification unit 70 displays, on a monitor or the like (not illustrated), a message concerning the crossing collision prevention support such as "be careful of vehicle approaching from the side". The notification unit 70 may display a map image of a car navigation system. The notification unit 70 may notify the driver of the presence of the other vehicle 302 (the other vehicle 12) by using voice or the like in addition to information displayed by the notification unit 70. Note that in a case where the determination unit 84 determines that the driver is not notified of the presence of the other vehicle 302 (the other vehicle 12), no message is displayed.

Figure 8:
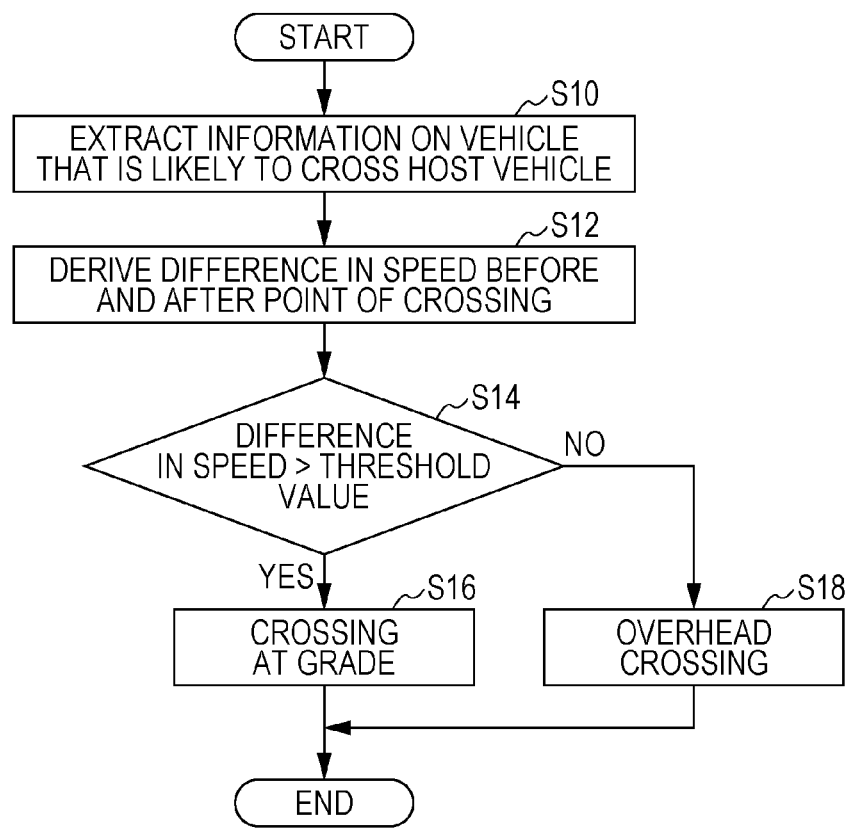
FIG. 8 is a flow chart illustrating an estimation procedure of the estimation unit in FIG. 4.

An operation of the communication system 100 configured as above is described below. FIG. 8 is a flow chart illustrating an estimation procedure of the estimation unit 82. The estimation unit 82 extracts information on a vehicle 12 that is likely to cross a host vehicle from the storage unit 80 (510). The estimation unit 82 derives a difference in speed before and after a point of crossing (S12). In a case where the difference in speed is larger than a threshold value (Yes in S14), the estimation unit 82 estimates that crossing at the point of crossing is crossing at grade (S16). Meanwhile, in a case where the difference in speed is not larger than the threshold value (No in S14), the estimation unit 82 estimates that crossing at the point of crossing is crossing with an overpass (S18).

Figure 9:
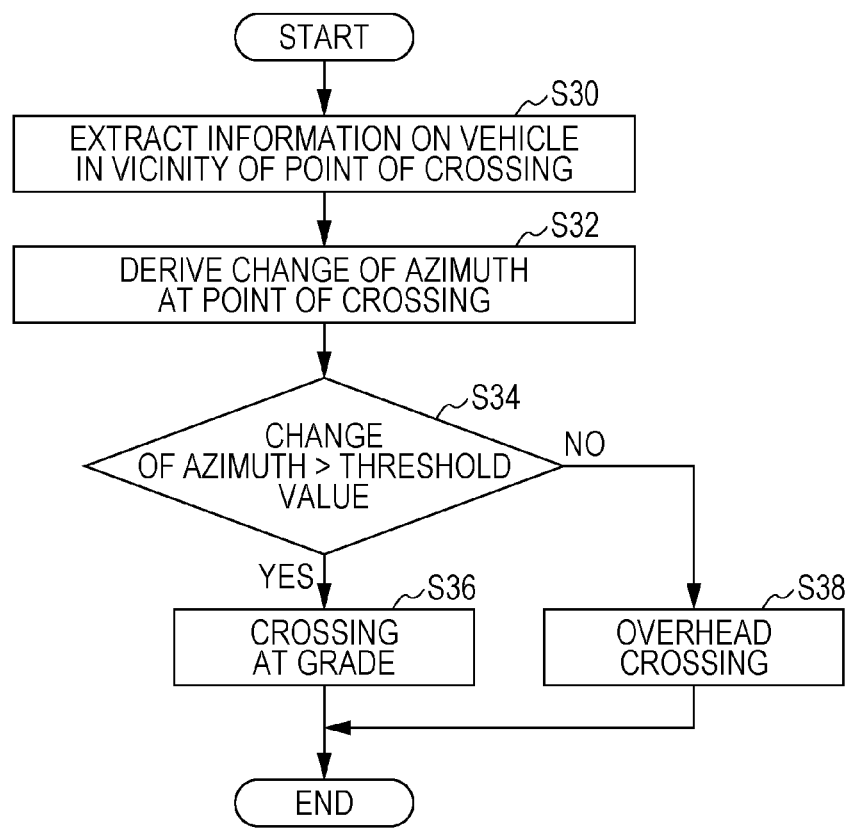
FIG. 9 is a flow chart illustrating another estimation procedure of the estimation unit in FIG. 4.

FIG. 9 is a flow chart illustrating another estimation procedure of the estimation unit 82. The estimation unit 82 extracts information on a vehicle 12 that is likely to cross a host vehicle from the storage unit 80 (S30). The estimation unit 82 derives a change of azimuth before and after a point of crossing (S32). In a case where the change of traveling direction is larger than a threshold value (Yes in S34), the estimation unit 82 estimates that crossing at the point of crossing is crossing at grade (S36). Meanwhile, in a case where the change of traveling direction is not larger than the threshold value (No in S34), the estimation unit 82 estimates that crossing at the point of crossing is crossing with an overpass (S38).

Figure 10:
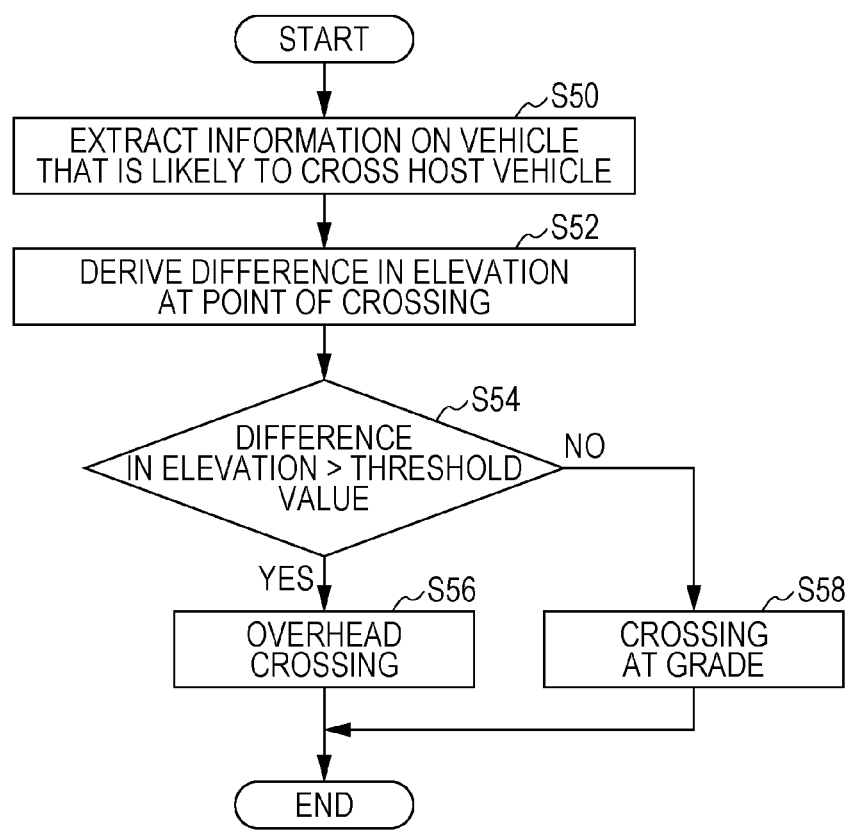
FIG. 10 is a flow chart illustrating still another estimation procedure of the estimation unit in FIG. 4.

FIG. 10 is a flow chart illustrating still another estimation procedure of the estimation unit 82. The estimation unit 82 extracts information on a vehicle 12 that is likely to cross a host vehicle from the storage unit 80 (S50). The estimation unit 82 derives a difference in elevation at a point of crossing (S52). In a case where the difference in elevation is larger than a threshold value (Yes in S54), the estimation unit 82 estimates that crossing at the point of crossing is crossing with an overpass (S56). Meanwhile, in a case where the difference in elevation is not larger than the threshold value (No in S54), the estimation unit 82 estimates that crossing at the point of crossing is crossing at grade (S58).

FIG. 11 is a flow chart illustrating a support determination procedure of the terminal device 14. In a case where there is another vehicle that is likely to cross a host vehicle (Yes in S70) and where crossing at a point of crossing is crossing at grade (Yes in S72), the determination unit 84 executes a driving support (S74). In a case where there is no other vehicle that is likely to cross a host vehicle (No in S70) or in a case where crossing at a point of crossing is not crossing at grade (No in S72), Step 74 is skipped.

According to the embodiment of the present disclosure, a structure of crossing at a point of crossing is estimated on the basis of path history information. It is therefore possible to increase the amount of information used for estimation of the structure of crossing. Since the amount of information used for estimation of the structure of crossing is increased, it is possible to improve the estimation accuracy. Furthermore, since whether or not to notify a driver of the presence of another vehicle is determined in accordance with the structure of crossing, collision determination depending on the structure of crossing can be executed. Furthermore, since collision determination depending on the structure of crossing can be executed, erroneous collision determination at the point of crossing can be suppressed without using a map. Furthermore, since a driver is notified of the presence of another vehicle in a case where it is estimated that the structure of crossing is crossing at grade, the driver can be notified of a risk. Furthermore, since it is determined that a driver is not notified of the presence of another vehicle in a case where it is estimated that the structure of crossing is crossing with an overpass, it is possible to omit unnecessary notification. Since whether the structure of crossing is crossing at grade or crossing with an overpass is estimated on the basis of a change of speed, erroneous collision determination at the point of crossing can be suppressed without using a map. Furthermore, since whether the structure of crossing is crossing at grade or crossing with an overpass is estimated on the basis of a change of traveling direction, erroneous collision determination at the point of crossing can be suppressed without using a map. Furthermore, since whether the structure of crossing is crossing at grade or crossing with an overpass is estimated on the basis of a combination of a change of speed and a change of traveling direction, it is possible to improve the estimation accuracy. Furthermore, since whether the structure of crossing is crossing at grade or crossing with an overpass is estimated on the basis of a difference in elevation, erroneous collision determination at the point of crossing can be suppressed without using a map.

The present disclosure has been described above on the basis of the embodiment. This embodiment is an illustrative example, and it can be understood by a person skilled in the art that a combination of the constituent elements or a combination of processes can be modified in various ways and that such modifications are encompassed within the scope of the present disclosure.

In the present embodiment, packet signals include position information and the like, and path history information is created in the storage unit 80 by accumulating the position information and the like of the packet signals. However, the present disclosure is not limited to this. For example, some packet signals may include path history information.

According to this modification, the path history information stored in the storage unit 80 can be created earlier.

In the present embodiment, in a case where the estimation unit 82 estimates that the structure of crossing is crossing with an overpass, the estimation unit 82 supplies the estimation result only to the determination unit 84. However, the present disclosure is not limited to this. For example, in a case where the estimation unit 82 estimates that the structure of crossing is crossing with an overpass, the estimation unit 82 may supply the estimation result to the storage unit 80 and the generation unit 66. The information of crossing with an overpass stored in the storage unit 80 is used in a case where the vehicle 12 travels the vicinity of the point of crossing next time. This omits the estimation process of the estimation unit 82. Furthermore, the generation unit 66 transmits a packet signal including the information of crossing with an overpass. This makes it possible to notify other terminal devices 14 of the presence of crossing with an overpass. According to the present modification, an crossing with an overpass estimation process is omitted. This makes it possible to simplify processing.

In the present embodiment, the estimation unit 82 estimates that crossing at the point of crossing is crossing at grade in a case where the estimation unit 82 detects at least one vehicle 12 whose change of speed exceeds a threshold value. However, the present disclosure is not limited to this. For example, the estimation unit 82 may estimate that crossing at the point of crossing is crossing at grade in a case where the estimation unit 82 detects a predetermined number of (two or more) vehicles 12 whose change of speed exceeds the threshold value. According to the present modification, it is possible to reduce the influence of an error included in the change of speed.

In the present embodiment, the estimation unit 82 estimates that crossing at the point of crossing is crossing at grade in a case where the estimation unit 82 detects at least one vehicle 12 whose change of traveling direction exceeds a threshold value. However, the present disclosure is not limited to this. For example, the estimation unit 82 may estimate that crossing at the point of crossing is crossing at grade in a case where the estimation unit 82 detects a predetermined number of (two or more) vehicles 12 whose change of traveling direction exceeds the threshold value. According to the present modification, it is possible to reduce the influence of an error included in the change of traveling direction.

One aspect of the present disclosure is summarized as follows.

(1) A wireless communication device of one aspect of the present disclosure is a wireless communication device that is mountable in a vehicle, including: an acquirer that acquires first position information on the vehicle in which the wireless communication device is mounted; a receiver that receives a packet signal from another wireless communication device, the packet signal including second position information on another vehicle in which the other wireless communication device is mounted; a storage that stores log information, the log information including at least one of the previously acquired first position information and the second position information included in the previously received packet signal; and a controller operative to: predict whether the vehicle and the other vehicle cross each other at a point of crossing at which at least two roads cross each other, on the basis of the currently acquired first position information and the second position information included in the currently received packet signal; estimate a structure of crossing corresponding to the point of crossing, on the basis of the stored history information; and determine, in a case where it is predicted that the vehicle and the other vehicle cross each other at the point of crossing, whether or not to notify a presence of the other vehicle to a driver of the vehicle, in accordance with the structure of crossing corresponding to the point of crossing.

According to this aspect, a structure of crossing at a point of crossing is estimated on the basis of the path history information, and whether or not to notify a driver of the presence of another vehicle is determined. Therefore, collision determination based on the structure of crossing can be executed.

(2) In the aspect, the wireless communication device may be arranged such that the first position information includes current position information, traveling direction information, and speed information of the vehicle, and the second position information includes current position information, traveling direction information, and speed information of the other vehicle.

(3) In the aspect, the wireless communication device may be arranged such that the controller is further operative to: estimate whether the structure of crossing is crossing at grade or crossing with an overpass; and determine that the driver of the vehicle is notified of the presence of the other vehicle in a case where it is estimated that the structure of crossing is crossing at grade.

In this case, since it is determined that the driver of the vehicle is notified of the presence of the other vehicle in a case where it is estimated that the structure of crossing is crossing at grade, the driver can be notified of a risk. Furthermore, since it is determined that the driver of the vehicle is not notified of the presence of the other vehicle in a case where it is estimated that the structure of crossing is crossing with an overpass, unnecessary notification can be omitted.

(4) In the aspect, the wireless communication device may be arranged such that the controller is further operative to estimate that the structure of crossing is crossing at grade in a case where it is determined that an amount of speed variation of at least one of the vehicle and the other vehicle at the point of crossing exceeds a first threshold value, on the basis of the stored history information.

In this case, since whether a structure of crossing is crossing at grade or crossing with an overpass is estimated on the basis of a change of speed, erroneous collision determination at a point of crossing can be suppressed without using a map.

(5) In the aspect, the wireless communication device may be arranged such that the controller is further operative to estimate that the structure of crossing is crossing at grade in a case where it is determined that an amount of change of traveling direction of at least one of the vehicle and the other vehicle at the first point of crossing exceeds a second threshold value, on the basis of the stored history information.

In this case, since whether a structure of crossing is crossing at grade or crossing with an overpass is estimated on the basis of a change of traveling direction, erroneous collision determination at a point of crossing can be suppressed without using a map.

(6) In the aspect, the wireless communication device may be arranged such that the controller is further operative to estimate that the structure of crossing is crossing at grade in a case where it is determined that a difference in elevation between the vehicle and the other vehicle traveling on respective two roads that cross at the point of crossing is smaller than a third threshold value, on the basis of the stored history information.

In this case, since whether a structure of crossing is crossing at grade or crossing with an overpass is estimated on the basis of a difference in elevation, erroneous collision determination at a point of crossing can be suppressed without using a map.

What is claimed is:

1. A wireless communication system comprising at least a first vehicle and a second vehicle, wherein
   the first vehicle has at least a first GPS receiver, and is configured to acquire first position information of the first vehicle, first traveling direction information of the first vehicle, first speed information of the first vehicle, and first elevation information of the first vehicle from the first GPS receiver,
   the second vehicle has at least a second GPS receiver, and is configured to acquire second position information of the second vehicle, second traveling direction information of the second vehicle, second speed information of the second vehicle, and second elevation information of the second vehicle from the second GPS receiver,
   the first vehicle is configured to receive packet signals from the second vehicle, each of the packet signals including at least the second position information of the second vehicle, the second traveling direction information of the second vehicle, the second speed information of the second vehicle, and the second elevation information of the second vehicle,
   while there is a possibility that the first vehicle, traveling on a first road, collides with the second vehicle, traveling on a second road, at a point where one of the first and second roads crosses over another of the first and second roads, based on at least one of the first position information, the first traveling direction information, the first speed information, the second position information, the second traveling direction information, and the second speed information, when a difference in elevation between the first vehicle and the second vehicle based on the first elevation information of the first vehicle and the second elevation information of at least one of the packet signals received from the second vehicle, is smaller than a threshold value, the first vehicle notifies a driver of the first vehicle of a presence of the second vehicle,
   while there is the possibility that the first vehicle collides with the second vehicle at the point of crossing based on at least one of the first position information, the first traveling direction information, the first speed information, the second position information, the second traveling direction information, and the second speed information, when the difference in elevation between the first vehicle and the second vehicle based on the first elevation information of the first vehicle and the second elevation information of at least one of the packet signals received from the second vehicle, is greater than the threshold value, the first vehicle does not notify the driver of the first vehicle of the presence of the second vehicle,
   the first vehicle is configured to perform an estimation process, the estimation process including:
   estimating that there is no overpass at the point where one of the first and second roads crosses over another of the first and second roads when the difference in elevation between the first vehicle and the second vehicle based on the first elevation information of the first vehicle and the second elevation information of at least one of the packet signals received from the second vehicle, is smaller than the threshold value; and
   estimating that there is an overpass at the point where one of the first and second roads crosses over another of the first and second roads when the difference in elevation between the first vehicle and the second vehicle based on the first elevation information of the first vehicle and the second elevation information of at least one of the packet signals received from the second vehicle, is greater than the threshold value,
   the first vehicle is configured to store an estimation result of the estimation process, and
   when the first vehicle travels the vicinity of the point next time, the first vehicle is configured to omit the estimation process by using the stored estimation result.

2. The wireless communication system according to claim 1, wherein the first vehicle further comprises a first acquisition unit having the first GPS receiver, and the second vehicle further comprises a second acquisition unit having the second GPS receiver.

3. The wireless communication system according to claim 1, wherein the first vehicle further comprises an antenna configured to receive the packet signals from the second vehicle.

4. The wireless communication system according to claim 1, wherein the first vehicle further comprises a storage configured to store at least one of the first position information, the first traveling direction information, the first speed information, the second position information, the second traveling direction information, the second speed information, the first elevation information, and the second elevation information.

5. The wireless communication system according to claim 1, wherein the first vehicle further comprises a controller operative to:
   determine that there is the possibility that the first vehicle collides with the second vehicle based on at least one of the first position information, the first traveling direction information, the first speed information, the second position information, the second traveling direction information, and the second speed information;
   determine that the difference in elevation between the first vehicle and the second vehicle is smaller than the threshold value;
   determine that the difference in elevation between the first vehicle and the second vehicle is greater than the threshold value;
   in response to the determining that the difference in elevation between the first vehicle and the second vehicle is smaller than the threshold value, notify the driver of the first vehicle of the presence of the second vehicle; and
   in response to the determining that the difference in elevation between the first vehicle and the second vehicle is greater than the threshold value, not to notify the driver of the first vehicle of the presence of the second vehicle.

6. The wireless communication system according to claim 1, wherein the first vehicle further comprises a notification unit that notifies the driver of the first vehicle of the presence of the second vehicle.

7. A vehicle for a wireless communication system comprising at least a first vehicle as the vehicle and a second vehicle, wherein the first vehicle having at least a first GPS receiver, and configured to acquire first position information of the first vehicle, first traveling direction information of the first vehicle, first speed information of the first vehicle, and first elevation information of the first vehicle from the first GPS receiver,
- the second vehicle having at least a second GPS receiver, and configured to acquire second position information of the second vehicle, second traveling direction information of the second vehicle, second speed information of the second vehicle, and second elevation information of the second vehicle from the second GPS receiver,
- the first vehicle configured to receive packet signals from the second vehicle, each of the packet signals including at least the second position information of the second vehicle, the second traveling direction information of the second vehicle, the second speed information of the second vehicle, and the second elevation information of the second vehicle,
- while there is a possibility that the first vehicle, traveling on a first road, collides with the second vehicle, traveling on a second road, at a point where one of the first and second roads crosses over another of the first and second roads, based on at least one of the first position information, the first traveling direction information, the first speed information, the second position information, the second traveling direction information, and the second speed information, when a difference in elevation between the first vehicle and the second vehicle based on the first elevation information of the first vehicle and the second elevation information of at least one of the packet signals received from the second vehicle, is smaller than a threshold value, the first vehicle notifies a driver of the first vehicle of a presence of the second vehicle,
- while there is the possibility that the first vehicle collides with the second vehicle based on at least one of the first position information, the first traveling direction information, the first speed information, the second position information, the second traveling direction information, and the second speed information, when the difference in elevation between the first vehicle and the second vehicle based on the first elevation information of the first vehicle and the second elevation information of at least one of the packet signals received from the second vehicle, is greater than the threshold value, the first vehicle does not notify the driver of the first vehicle of the presence of the second vehicle,
- the first vehicle is configured to perform estimation process, the estimation process including:
- estimating that there is no overpass at the point where one of the first and second roads crosses over another of the first and second roads when the difference in elevation between the first vehicle and the second vehicle based on the first elevation information of the first vehicle and the second elevation information of at least one of the packet signals received from the second vehicle, is smaller than the threshold value; and
- estimating that there is an overpass at the point where one of the first and second roads crosses over another of the first and second roads when the difference in elevation between the first vehicle and the second vehicle based on the first elevation information of the first vehicle and the second elevation information of at least one of the packet signals received from the second vehicle, is greater than the threshold value, the first vehicle is configured to store an estimation result, and
- when the first vehicle travels the vicinity of the structure of the crossing next time, the first vehicle is configured to omit the estimation process by using the stored estimation result.

8. The vehicle for the wireless communication system according to claim 7, wherein the first vehicle further comprises a first acquisition unit having the first GPS receiver, and the second vehicle further comprises a second acquisition unit having the second GPS receiver.

9. The vehicle for the wireless communication system according to claim 7, wherein the first vehicle further comprises an antenna configured to receive the packet signals from the second vehicle.

10. The vehicle for the wireless communication system according to claim 7, wherein the first vehicle further comprises a storage configured to store at least one of the first position information, the first traveling direction information, the first speed information, the second position information, the second traveling direction information, the second speed information, the first elevation information, and the second elevation information.

11. The vehicle for the wireless communication system according to claim 7, wherein the first vehicle further comprises a controller operative to:
- determine that there is the possibility that the first vehicle collides with the second vehicle based on at least one of the first position information, the first traveling direction information, the first speed information, the second position information, the second traveling direction information, and the second speed information;
- determine that the difference in elevation between the first vehicle and the second vehicle is smaller than the threshold value;
- determine that the difference in elevation between the first vehicle and the second vehicle is greater than the threshold value;
- in response to the determining that the difference in elevation between the first vehicle and the second vehicle is smaller than the threshold value, notify the driver of the first vehicle of the presence of the second vehicle; and
- in response to the determining that the difference in elevation between the first vehicle and the second vehicle is greater than the threshold value, not to notify the driver of the first vehicle of the presence of the second vehicle.

12. The vehicle for the wireless communication system according to claim 7, wherein the first vehicle further comprises a notification unit notifies the driver of the first vehicle of the presence of the second vehicle.

* * * * *